United States Patent [19]

Hoppmann et al.

[11] 4,455,067
[45] Jun. 19, 1984

[54] METHOD OF MODIFYING SLIDE TRANSPARENCIES SO AS TO PROVIDE UNIFORM ILLUMINATION IN ANGULAR PROJECTION

[75] Inventors: Kurt H. Hoppmann, Falls Church; James G. Lin; Peter G. Hoppmann, both of Springfield, all of Va.

[73] Assignee: Hoppmann Corporation, Chantilly, Va.

[21] Appl. No.: 173,252

[22] Filed: Jul. 29, 1980

[51] Int. Cl.$^3$ .............................................. B03B 21/00
[52] U.S. Cl. ..................................................... 353/69
[58] Field of Search ..................... 353/69, 70; 354/160; 355/52, 71; 350/314

[56] References Cited

U.S. PATENT DOCUMENTS 1,651,574  12/1927  Beechlyn ............................... 353/70
2,004,798   6/1935  Poser .............................. 350/314 X
2,296,928   9/1942  Briechle et al. ................. 350/70 X
2,299,682  10/1942  Conant .................................. 353/69
3,049,966   8/1962  Gruner .
4,166,694   9/1979  Hirning et al. ..................... 353/94 X

FOREIGN PATENT DOCUMENTS 15729 of 1906  United Kingdom .................. 353/70

*Primary Examiner*—Harry N. Haroian
*Attorney, Agent, or Firm*—David H. Semmes; Warren E. Olsen

[57] ABSTRACT

Photography, particularly, a method of modifying slide transparencies so as to eliminate distortion and to provide uniform illumination in oblique projection, for example, upon rear view screens.

The method of modifying slide transparencies includes supporting the object to be photographed at an angle with respect to the optical path of the camera; selectively illuminating the object to be photographed such that the portion farthest from the camera receives the greatest portion of the light with the rest of the object being gradually and continuously less illuminated so the portion nearest the camera receives the least light; and, taking a picture of the object, such that the transparency defines the object being photographed in trapezoidal form with the wider base being the least illuminated and the narrow apex being the greatest illuminated.

2 Claims, 6 Drawing Figures

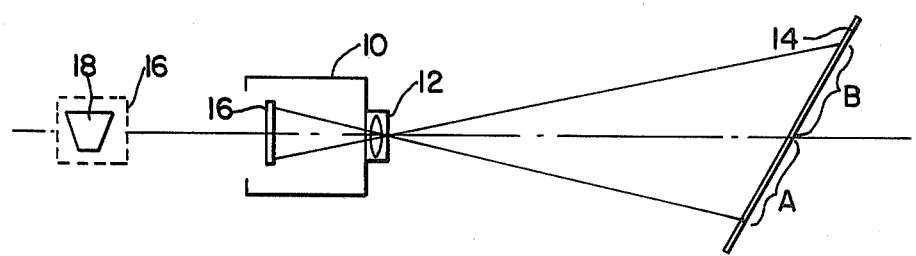
FIG. 1
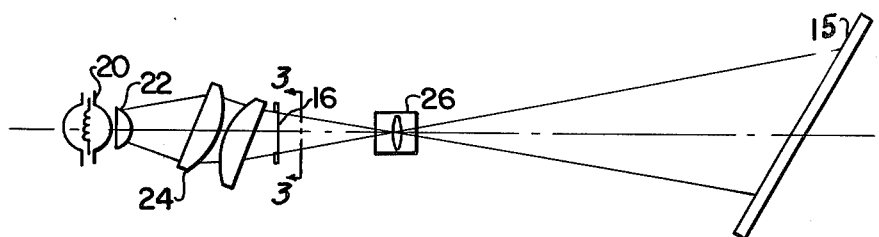
FIG. 2
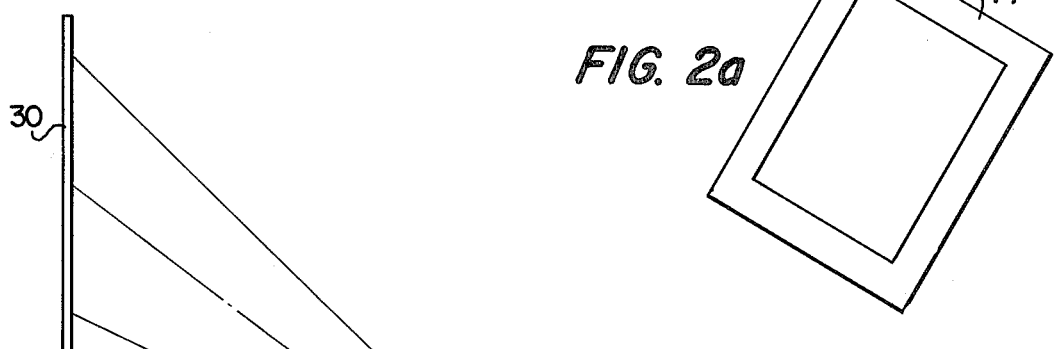
FIG. 2a
FIG. 4
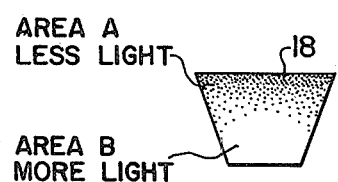
FIG. 3
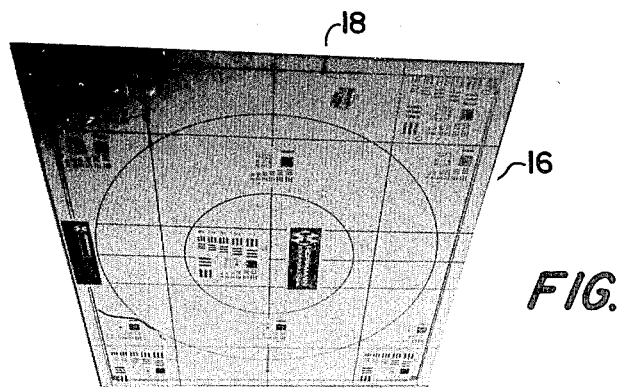
FIG. 5

4,455,067

METHOD OF MODIFYING SLIDE TRANSPARENCIES SO AS TO PROVIDE UNIFORM ILLUMINATION IN ANGULAR PROJECTION

CROSS REFERENCE TO RELATED APPLICATIONS

The present application concerns a method of modifying slide transparencies so as to provide uniform illumination in angular, i.e., oblique, projection of the image upon a viewing screen. The slide transparencies which are modified according to the present invention, may be used in rear view projection systems such as described in the applicants' co-pending METHOD OF CORRECTING NON-UNIFORM ILLUMINATION IN OBLIQUE PROJECTION OF SLIDE TRANSPARENCIES (Ser. No. 173,251), filed July 29, 1980.

BACKGROUND OF THE INVENTION (1) Field of the Invention

Photography, particularly photography of objects so as to create modified slide transparencies for use in angular (oblique) projection upon a viewing screen. Such angular projection results both in geometric distortion, known as the "Keystone effect", and in non-uniform illumination of the image upon the viewing screen. The non-uniform illumination is incident to the angle of projection, the farther portion of the image from the projection lens receiving less light and the nearer portion receiving greater light. Because of such drawbacks, projection at angles which greatly differ from normal have since been avoided.

(2) Description of the Prior Art

Being submitted separately under the provisions of 37 CFR 1.97.

SUMMARY OF THE INVENTION

According to the present invention, image distortion and uneven illumination in angular or oblique projection of slide transparencies are largely overcome.

The slide transparencies are modified in preparation so as to provide uniform illumination of the image in angular projection onto a viewing screen. The method includes supporting the object to be photographed at an angle with respect to the optical path of the camera; selectively illuminating the article to be photographed, such that the portion of the object farthest from the camera receives greater light and the portion nearest the camera receives lesser light; and taking a picture of the object, such that the slide transparency defines the object being photographed in truncated form with the wider base being less illuminated and the narrow apex being greater illuminated.

Modifications of invention include supporting the object to be photographed at an angle which approximates the ultimate angle of projection through the transparency and onto a viewing screen. Also, illuminating the transparency during projection onto a viewing screen may include collimating of the light, so as to transmit a greater portion of light emanating from a light source towards a selected portion of the slide transparency, thereby providing uniform illumination in projection onto an obliquely positioned viewing screen.

DESCRIPTION OF THE DRAWINGS

FIG. 1 is a schematic view of the present method of supporting the article to be photographed at an oblique angle with respect to the optical path of the camera, so as to provide a trapezoidal image in the slide transparency.

FIG. 2 is a schematic view of the method of illuminating the transparency by tilted collimation, such that the optical axis of the light source is diverted towards the lower part of the slide transparency and, thus, projecting a greater portion of light onto the upper portion of the viewing screen.

FIG. 2a is front elevation of the article being photographed.

FIG. 3 is a transverse section of the slide transparency, taken along section line 3—3, showing portions of the slide transparency selectively illuminated, the upper (Area A) receiving less light from the light source and the lower portion of the slide transparency (Area B) receiving more light from the light source as a result of tilted collimation.

FIG. 4 is a schematic view similar to FIG. 2, showing projection of the image transparency onto a reflector and, thence, onto a rear view screen.

FIG. 5 is a lithograph of a slide transparency, modified according to the present invention and as illustrated in FIG. 1, such that the article being photographed is captured in trapezoidal form. The transparency also characteristically exhibits a positive image of increasing illumination which varies gradually and continuously from the lighter (small) end to the darker (large) base.

DESCRIPTION OF THE PREFERRED EMBODIMENTS

In FIG. 1 there is illustrated a camera 10 having lens 12 with its optical path extending to the article to be photographed 14, positioned at an oblique angle with respect to the optical path. Camera 10 includes an interiorly positioned negative or slide transparency 16.

As is well known, a photograph of the article 14, positioned at an oblique angle with respect to the optical path, manifests a distortion known as the "Keystone effect" which renders article 14 upon the negative or slide transparency in trapezoidal form 18. (See FIGS. 3 and 5). Also, of course, if a single light source is projected towards screen 15 which is positioned at an oblique angle as in FIG. 1, the lower portion A, being closer to the light source would receive more light and the upper portion B, being farther from the light would receive less light.

According to the present invention, applicants overcome both the "Keystone effect" distortion and non-uniform illumination by positioning the object to be photographed at an oblique angle, approximating the ultimate angle of projecting the image upon a viewing screen and, also, by gradually and continuously increasing illumination of the object 14 to be photographed, such that the lower portion A nearest the camera receives less light and the upper portion B farthest from the camera receives more light.

As a result, during oblique projection onto a viewing screen, the "Keystone effect" is virtually eliminated and the ultimate projection of the image onto the viewing screen appears to be of uniform illumination with enhanced color perception. The method of modifying the negative is illustrated in FIG. 1. The method of selectively illuminating the modified slide transparency during image projection is illustrated in FIG. 2.

The foregoing method of selectively illuminating the slide transparency is illustrated in FIG. 2 wherein a xenon light source 20, approximating 900 watts is positioned adjacent aspheric lens 22. A pair of collimating lenses 24 are tilted with respect to the vertically positioned slide transparency 16. As a result, a greater portion of the light emanating from light source 20 is directed to the lower portion (Area B) of the transparency and a lesser portion of the light is directed to the upper portion (Area A). The image thus created is reversed by projection lens 26, such that a greater portion of light is transmitted to the upper portion (Area A) of screen 15 and a lesser portion of light is transmitted to the lower portion (Area B) of screen 15. This method results in a uniform illumination of the image upon the obliquely supported viewing screen. The effect of tilted collimating shown in FIG. 2, is illustrated in FIG. 3 showing the trapizoidal slide transparency image 18 receiving less light in the upper portion (Area A) and more light in the lower portion (Area B).

In FIG. 4 the tilted collimating principle illustrated in FIG. 2 is illustrated further in a rear view projection system involving a primary reflecting mirror 28. The primary reflecting mirror 28 directs obliquely the image to an upper rear view projection screen 30. In this example the angle of projection from primary mirror 28 to screen 30 is approximately 45 degrees.

FIG. 5 is a photolithograph of an actual slide transparency 16, modified according to FIG. 1, wherein the object to be photographed 14 was supported at an oblique angle with respect to the optical path of camera 10. The resultant slide transparency 16 depicts the photographed object 14 in trapezoidal form 18. As is apparent, object 14 was variously illuminated, such that trapezoidal image 18 displayed a lesser portion of light in the upper portion and displayed a greater light in the lower portion. As a result, selective illumination of image 18 by tilted collimating, according to FIG. 2, projects the image without distortion and without light loss upon viewing screen 15, as in FIG. 2, or upon rear view viewing screen 30, as in FIG. 4.

During photography as illustrated in FIG. 1, object 14 was increasingly illuminated in gradual and continuous steps. In this one particular case, if one were to take light readings of the object 14 in three vertical sections, one would have found the lower (larger) portion receiving approximately 11% of the light, the middle portion approximately 32%, and the upper portion approximately 57% of the light. This is only one particular case, as lighting requirements change with every different object to be photographed.

We claim:

1. Method for correcting non-uniform illumination in oblique projection of slide transparencies, comprising:
   A. Modifying a slide transparency of an obliquely positioned object by illuminating the object such that the portion farthest from the camera receives the greatest portion of light and the portion nearest the camera receives the least light;
   B. Taking a picture such that the slide transparency defines the object being photographed in trapezoidal form with the wider base being the least illuminated and the narrow apex being the greatest illuminated;
   C. Supporting the modified slide transparency within a projection system;
   D. Selectively illuminating with an intensified light source by tilted condensing and collimating of light towards said transparency, such that the optical path is narrowed and its axis diverted towards the lower portion of said transparency, such that a greater portion of light is projected through the lower portion of the transparency and a lesser portion of light is projected through the upper portion of the transparency;
   E. Magnifying the light projected as an image through said transparency; and
   F. Displaying the image upon an angularly supported viewing screen, such that the farthest portion of the viewing screen receives the greater portion of light and the nearest portion receives the lesser light.

2. Method for correcting non-uniform illumination in oblique projection of slide transparencies as in claim 1, including varying the angle of said tilted condensing relative to the angle of oblique projection.

* * * * *